United States Patent
Aeloiza et al.

(10) Patent No.: US 9,525,348 B1
(45) Date of Patent: Dec. 20, 2016

(54) POWER CONVERTER HAVING INTEGRATED CAPACITOR-BLOCKED TRANSISTOR CELLS

(71) Applicant: ABB Technology AG, Zurich (CH)

(72) Inventors: Eddy Aeloiza, Apex, NC (US); Francisco Canales, Daettwil-Baden (CH); Rolando Burgos, Blacksburg, VA (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/814,914

(22) Filed: Jul. 31, 2015

(51) Int. Cl.
*H02M 3/158* (2006.01)

(52) U.S. Cl.
CPC .................. *H02M 3/158* (2013.01)

(58) Field of Classification Search
CPC ....... H02M 3/158; H02M 3/1588; H02M 7/48
See application file for complete search history.

(56) References Cited

U.S. PATENT DOCUMENTS

| | | | | |
|---|---|---|---|---|
| 7,965,069 B2* | 6/2011 | Watanabe | | H02M 3/158 323/271 |
| 8,982,588 B2* | 3/2015 | Buiatti | | H02M 3/1582 323/271 |
| 2015/0194885 A1* | 7/2015 | Baernklau | | H02M 7/483 323/271 |
| 2015/0207401 A1* | 7/2015 | Zhang | | H02M 3/158 323/271 |
| 2016/0072387 A1* | 3/2016 | Schmalnauer | | H02M 3/158 323/271 |
| 2016/0105109 A1* | 4/2016 | Jasim | | H02M 3/155 323/271 |
| 2016/0190924 A1* | 6/2016 | Koyanagi | | H02M 7/483 323/271 |

FOREIGN PATENT DOCUMENTS

CA 2827664 A1 3/2014

OTHER PUBLICATIONS

Alvarez, Rodrigo et al., "Characterization of 4.5 kV / 2.4 kA Press Pack IGBT Including Comparison with IGCT", IEEE Energy Conversion Congress and Exposition (ECCE), Sep. 2013, pp. 260-267.

(Continued)

*Primary Examiner* — Gary L Laxton
(74) *Attorney, Agent, or Firm* — Taft Stettinius & Hollister LLP

(57) ABSTRACT

A converter for connecting a voltage source to a load includes a plurality of ICBT (integrated capacitor blocked transistor) cells configured as switches and connected in series to form a series connection path, a main capacitor connected across the series connection path, and a controller. Each ICBT cell includes a main transistor disposed in the series connection path and a series connected auxiliary transistor and auxiliary capacitor coupled in parallel with the main transistor. The controller is operable to develop a voltage across the main capacitor which exceeds a voltage rating of the ICBT cells, by switching the ICBT cells so as to commutate current within the individual ICBT cells without the ICBT cells providing active power to the load so that power flow is from the voltage source, to the main capacitor, to the load and not through the auxiliary transistors and the auxiliary capacitors.

21 Claims, 12 Drawing Sheets

(56) References Cited

OTHER PUBLICATIONS

Alvarez, Rodrigo et al., "Characterization of a new 4.5 kV Press Pack SPT+ IGBT for Medium Voltage Converters", IEEE Energy Conversion Congress and Exposition, ECCE, Sep. 2009, pp. 3954-3962.

Alvarez, Rodrigo et al., "Comparison of Press-Pack IGBT at Hard Switching and Clamp Operation for Medium Voltage Converters", IEEE Proceedings of the 2011-14th European Conference on Power Electronics and Applications (EPE 2011), Aug. 30, 2011-Sep. 1, 2011, pp. 1-7.

Baraia, Igor et al., "An Experimentally Verified Active Gate Control Method for the Series Connection of IGBT/Diodes", IEEE Transactions on Power Electronics, vol. 27, No. 2, Feb. 2012, pp. 1025-1038.

Bill, Philip et al., "Novel press pack IGBT Device and Switch Assembly for Pulse Modulators", 2011 IEEE Pulsed Power Conference (PPC), Jun. 2011, pp. 1120-1123.

Brueckner, Thomas et al., "Snubbered High-Power Press-Pack IGBT Converter", 15th European Conference on Power Electronics and Applications (EPE), Sep. 2013, pp. 1-7.

Eicher, Simon et al., "4.5kV Press Pack IGBT Designed for Ruggedness and Reliability", 39th IAS Annual Meeting, Conference Record of the 2004 IEEE Industry Applications Conference, vol. 3, Oct. 2004, pp. 1534-1539.

Erickson, Robert et al., "A New Family of Matrix Converters", IECON'01: The 27th Annual Conference of the IEEE Industrial Electronics Society, Nov. 2001, pp. 1515-1520.

Ferreira, Jan, "The Multilevel Modular DC Converter", IEEE Transactions on Power Electronics, vol. 28, No. 10, Oct. 2013, pp. 4460-4465.

He, Weiwei et al., "IGBT Series Connection under Active Voltage Control", Proceedings of the 2011-14th European Conference on Power Electronics and Applications (EPE 2011), Aug. 30, 2011-Sep. 1, 2011, pp. 1-9.

Jakob, Roland, "3-Level High Power Converter with Press Pack IGBT", European Conference on Power Electronics and Applications, Sep. 2007, pp. 1-7.

Lesnicar, Anton et al., "An Innovative Modular Multilevel Converter Topology Suitable for a Wide Power Range", IEEE Bologna PowerTech Conference, Jun. 23-26, 2003, Bologna, Italy, pp. 1-6.

Ludois, Dan et al., "Hierarchical Control of Bridge-of-Bridge Multilevel Power Converters", IEEE Transactions on Industrial Electronics, vol. 57, No. 8, Aug. 2010, pp. 2679-2690.

Ortiz, G. et al., "A 180MW, 450kV Solid State Modulator Based on Press Pack IGBT Technology", 2010 IEEE International Power Modulator and High Voltage Conference (IPMHVC), May 2010, pp. 303-306.

Palmer, P.R. et al., "Experimental comparison of methods of employing IGBTs connected in series", IEE Proceedings—Electric Power Applications, vol. 151, No. 5, Sep. 2004, pp. 576-582.

Palmer, Patrick et al., "The Series Connection of IGBT's with Active Voltage Sharing", IEEE Transactions on Power Electronics, vol. 12, No. 4, Jul. 1997, pp. 637-644.

Perez, Marcelo et al., "Circuit Topologies, Modeling, Control Schemes, and Applications of Modular Multilevel Converters", IEEE Transactions on Power Electronics, vol. 30, No. 1, Jan. 2015, pp. 4-17.

Rohner, Steffen et al., "Modulation, Losses, and Semiconductor Requirements of Modular Multilevel Converters", IEEE Transactions on Industrial Electronics, vol. 57, No. 8, Aug. 2010, pp. 2633-2642.

Rytoft, Claes et al., "Power electronics applications in utilities: Semiconductors are a key enabler for power networks", ABB Review, 4/10, Feb. 2011, pp. 20-26.

Seo, Beom-Seok, "Synchronization of the points of turn-off time of series-connected power semiconductor devices using Miller effect", Proceedings of the 1992 International Conference on Industrial Electronics, Control, Instrumentation, and Automation, 1992, Power Electronics and Motion Control, Nov. 1992, pp. 325-329.

Teerakawanich, Nithiphat et al., "Design Optimization of Quasi-Active Gate Control for Series-Connected Power Devices", IEEE Transactions on Power Electronics, vol. 29, No. 6, Jun. 2014, pp. 2705-2714.

Zhou, Dongsheng et al., "A Practical Series Connection Technique for Multiple IGBT Devices", IEEE 32nd Annual Power Electronics Specialists Conference, PESC, 2001, vol. 4, pp. 2151-2155.

Gowaid, et al., "Analysis and Design of a Modular Multilevel Converter with Trapezoidal Modulation for Medium and High Voltage DC-DC Transformers", IEEE Transactions on Power Electronics, pp. 1-19.

Gowaid, et al., "Quasi Two-Level Operation of a Modular Multilevel Converter for Use in a High-Power DC Transformer With DC Fault Isolation Capability", IEEE Transactions on Power Electronics, vol. 30, No. 1, Jan. 2015, pp. 108-123.

Yang, Lei et al., "A Module Based Self-Balanced Series Connection for IGBT", Energy Conversion Congress and Exposition (ECCE), 2014 IEEE, pp. 1953-1958.

\* cited by examiner

POWER CONVERTER HAVING INTEGRATED CAPACITOR-BLOCKED TRANSISTOR CELLS

TECHNICAL FIELD

The instant application relates to power converters, and more particularly to medium voltage (MV) and high-voltage (HV) power converters.

BACKGROUND

Silicon power semiconductors are manufactured in standardized, yet only in few available voltage ratings, typically 600 V, 1.2 kV, 1.7 kV, 3.3 kV, 4.5 kV and 6.5 kV. The advent of SiC semiconductor devices with blocking voltages in the 10-15 kV range is expected to widen the selection range, nonetheless still being limited. To alleviate this constraint, two main approaches have been followed: series connection of power devices or multi-level converter topologies. For example, a medium voltage power converter can use two series-connected IGBTs (insulated gate bipolar transistors) per functional switch, thus doubling the effective 'switch' blocking voltage. This topology requires additional gate-drive and ancillary circuitry, including snubber and active voltage sharing controls as the static and dynamic voltage sharing between devices is of great difficulty and highly critical. The voltage-sharing problem exists regardless of whether semiconductor devices packaged in conventional wire-bond power modules or in press-pack type power modules are used.

The main advantage of press-pack devices, when compared to module-based devices, is that their failure mode is short circuit, which is necessary for the series connection of devices in order to maintain reliability in a series-connected string of devices. In the case of module-based devices, this shortcoming is typically handled by the addition of a bypass thyristor switch across the terminals of a power module, which is standard industrial practice in modular HVDC (high voltage DC) converter stations.

The alternative approach to connecting semiconductors in series is to adopt a multilevel topology. Multilevel topologies can be broadly classified as switching network and modular converter topologies. In the case of switching network topologies, the seemingly series-connected IGBTs only block half of the total DC bus voltage, which is accomplished through the use of clamping power diodes. In the case of modular converter topologies, namely the modular multilevel converter (MMC) and the alternate-arm converter (AAC), the converters themselves are comprised of sub-converters or power converter modules, referred to as power modules or power cells. The power modules float from an electrical standpoint, and thus their voltage rating, including that of their respective semiconductor components, is independent of the total converter rating but instead in terms of ground insulation. Their operation in general terms requires the power modules or power cells to actively participate in the power flow from source to load, acting as transient energy storage devices. As a result, these power modules have high energy storage requirements that increase cost, and also limit the power conversion functionality to AC-AC, AC-DC or DC-AC, thus ruling out their capacity to operate in pure DC-DC mode which significantly limits their capacity to operate in the low frequency range below 10 Hz.

SUMMARY

According to an embodiment of a converter for connecting a voltage source to a load, the converter comprises a plurality of ICBT (integrated capacitor blocked transistor) cells configured as switches and connected in series to form a series connection path, a main capacitor connected across the series connection path, and a controller. Each ICBT cell comprises a main transistor disposed in the series connection path and a series connected auxiliary transistor and auxiliary capacitor coupled in parallel with the main transistor. The main capacitor has a greater energy-power ratio as expressed in J/kVA than the auxiliary capacitors of the ICBT cells. The controller is operable to develop a voltage across the main capacitor which exceeds a voltage rating of the ICBT cells, by switching the ICBT cells so as to commutate current within the individual ICBT cells without the ICBT cells providing active power to the load so that power flow is from the voltage source, to the main capacitor, to the load and not through the auxiliary transistors and the auxiliary capacitors.

According to an embodiment of a method of voltage conversion between a voltage source and a load, the method comprises: connecting a plurality of ICBT cells configured as switches in series to form a series connection path, each ICBT cell comprising a main transistor disposed in the series connection path and a series connected auxiliary transistor and auxiliary capacitor coupled in parallel with the main transistor; connecting a main capacitor across the series connection path, the main capacitor having a greater energy-power ratio as expressed in J/kVA than the auxiliary capacitors of the ICBT cells; and developing a voltage across the main capacitor which exceeds a voltage rating of the ICBT cells, by switching the ICBT cells so as to commutate current within the individual ICBT cells without the ICBT cells providing active power to the load so that power flow is from the voltage source, to the main capacitor, to the load and not through the auxiliary transistors and the auxiliary capacitors.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a MV or HV multi-level power converter constructed from integrated capacitor-blocked transistor (ICBT) cells. Each ICBT cell includes two gate-controlled transistors in totem-pole configuration with a capacitor across their DC terminals to form an equivalent current-bidirectional, voltage-unidirectional switching device, which in ideal terms conducts current with zero-voltage across its terminals when in the 'on-state' and blocks voltage when in the 'off-state'. Each ICBT cell behaves functionally as any other transistor within a circuit, with the difference that its voltage-blocking functionality is provided by its integrated capacitor, as opposed to a transistor. This feature relaxes the operation of the ICBT integrated transistors in that the ICBT transistors only need to block the integrated capacitor voltage and not the circuit voltage across their terminals. Further, the sensitivity to the circuit or converter-level commutation loop is eliminated, as only the internal ICBT commutation loop between the integrated transistors is critical in terms of parasitic inductance minimization. As a result, the fast switching characteristic of wide-bandgap (WBG) devices such as SiC of GaN transistors can be retained when connecting multiple ICBT cells in series.

This represents a significant advantage given that the parasitic inductance associated with the series connection of several switching devices—let alone tens or hundreds of switching devices—provides a hard physical barrier to the switching frequency of the converter due to the dv/dt and di/dt limits that must be imposed to protect the semiconductor devices. Accordingly, a series connection of a plurality of ICBT cells yields a less constrained voltage-scaling capability. As a result, ICBT cells can be readily used to replace any current-bidirectional voltage-unidirectional power switch (transistor-diode combination) in any conventional circuit, including single and three-phase converters, DC-AC converters, AC-DC converters, AC-AC converters, DC-DC converters including DC-DC converters galvanically isolated between the input and the load, etc. Furthermore, ICBT cells of a power converter can be implemented with any type of semiconductor device, with any type of package, and with any type of semiconductor material, but particularly favors the adoption of WBG devices which have high switching speed, high efficiency, high breakdown voltage and high thermal conductivity.

Figure 1:
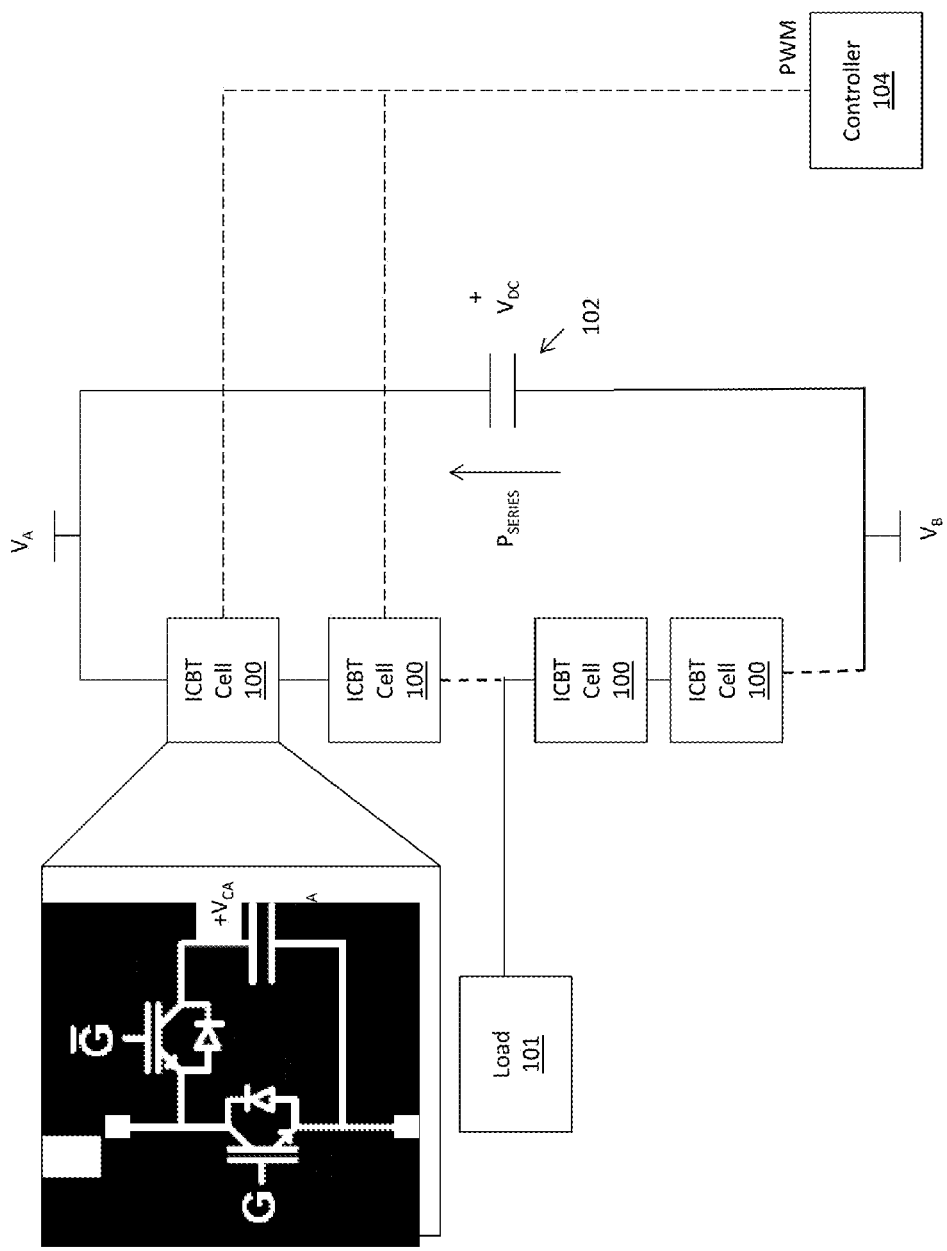
FIG. 1 illustrates an embodiment of a MV or HV power converter constructed from ICBT cells.

FIG. 1 broadly illustrates a MV or HV power converter leg constructed from ICBT (integrated capacitor blocked transistor) cells 100. The converter connects a voltage source ($V_{A,B}$) to a load 101. The ICBT cells 100 are configured as switches and connected in series to form a series connection path ($P_{SERIES}$) of the converter, a main capacitor 102 connected across the series connection path, and a controller 104. Each ICBT cell 100 comprises a main transistor ($Q_M$) disposed in the series connection path and a series connected auxiliary transistor ($Q_A$) and auxiliary capacitor ($C_A$) coupled in parallel with the main transistor. A separate diode ($D_M$, $D_A$) is connected in parallel with the respective transistors of each ICBT cell 100.

The main capacitor 102 is connected across the series connection path and has a greater energy-power ratio as expressed in J/kVA than the auxiliary capacitors of the ICBT cells 100. The controller 104 is operable to develop a voltage ($V_{DC}$) across the main capacitor 102 which exceeds a voltage rating of the ICBT cells 100, by switching the ICBT cells 100 so as to commutate current within the individual ICBT cells 100 without the ICBT cells 100 providing active power to the load. The controller 104 switches the ICBT cells 100 by switching the main transistor and the auxiliary transistor of each ICBT cell 100 in a complementary way ($G/\overline{G}$) with a first dead time (also referred to herein as intra-cell dead time) between turning off one of the main transistors of each ICBT cell 100 and turning on the auxiliary transistor within the same ICBT cell 100 and with a second dead time (also referred to herein as inter-cell dead time) between turning-off the main transistors of an arm carrying current and turning-on the main transistors of the same arm or an arm where the current is to commute.

For example in FIG. 1, a first inter-cell dead time can delay turning-on one of the main transistors in the top two ICBT cells 100 (i.e. the top arm) relative to turning-on the other main transistor in the top arm. A second inter-cell dead time can delay turning-on the main transistors in the bottom two ICBT cells 100 (i.e. the bottom arm) relative to turning-off the main transistors in the top arm. The first inter-cell dead time can control the slew rate of voltage (dv/dt) across the load 101. In some cases, the first inter-cell dead time is relatively small e.g. tens or hundreds of nano-seconds and less than both the second inter-cell dead time and the intra-cell dead time so as to not disturb the voltage balance and size of the auxiliary capacitors of the ICBT cells 100.

In one embodiment, the controller 104 uses PWM (pulse width modulation) to control the on/off state of the transistors of the ICBT cells 100. The control signal originating from the controller 104 and applied to the gate of the main transistor of each ICBT cell 100 is labeled 'G' in FIG. 1. The control signal originating from the controller 104 and applied to the gate of the auxiliary transistor of each ICBT cell 100 is labeled '$\overline{G}$' in FIG. 1. By controlling the switching of the ICBT cells 100 as described above, power flow is from the voltage source, to the main capacitor 102, to the load and not through the auxiliary transistors and auxiliary capacitors of the ICBT cells 100. Any standard controller such as one or more microcontrollers, microprocessors, ASICs (application-specific integrated circuits), etc. can be used for controlling the switching of the ICBT cells 100. Basic operation of each ICBT cell 100 is described next in connection with FIG. 2.

Figure 2:
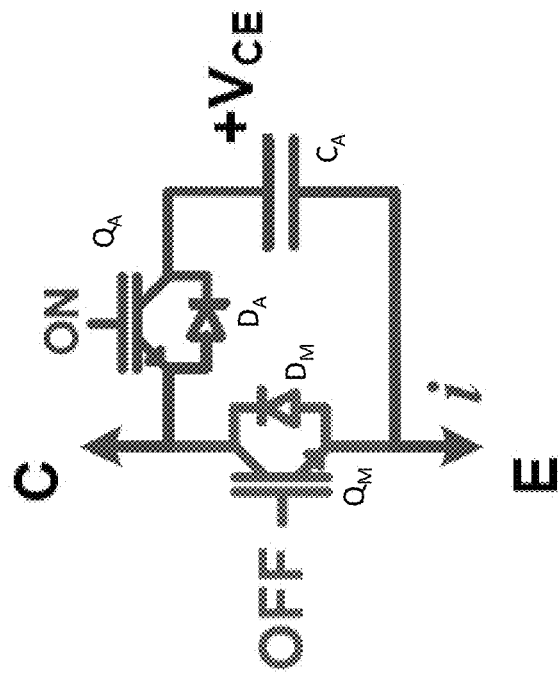
FIG. 2 illustrates on and off states of an ICBT cell included in a multi-level power converter constructed from ICBT cells.
Figure 2:
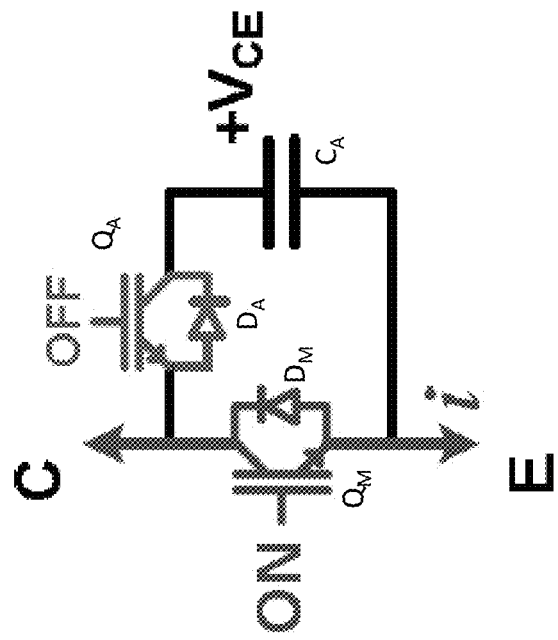

FIG. 2 shows the 'on state' and the 'off state' of each ICBT cell 100. The ICBT cell 100 operates as a switch as explained above. That is, the ICBT cell 100 conducts with zero voltage in the 'on state' and blocks voltage when in the 'off state'. In contrast, a conventional IGBT-based power converter module applies a capacitor voltage to the load when turned on and becomes a short circuit reflecting 0 V between its terminals when turned off. To complete the converter analogy, the conventional power converter module requires an inductor at its AC terminals, which acts as a current source.

The ICBT cell 100 on the other hand does not provide active power to the load when connected in a power converter circuit. Instead, power is sunk directly from the source to the load—as in any other switching converter. When in the 'on state', the auxiliary capacitor ($C_A$) is disconnected from the circuit and only freewheels a pulsating self-balancing current. This occurs on a switching cycle basis. A conventional IGBT-based power converter module instead has zero average active power, but throughout a complete line cycle. This means that the conventional power converter module has a significant ripple on top of the DC average value, as throughout the line cycle it sinks and injects active power to the load.

In contrast, the auxiliary capacitor of each ICBT cell 100 is charged through the auxiliary diode ($D_A$) of that ICBT cell 100 and remains fully charged with at most slight perturbations during switching of the ICBT cell 100 as will become even more evident later herein. The voltage of the auxiliary capacitor of each ICBT cell 100 is imposed on the main transistor ($Q_M$) of that ICBT cell 100 when the auxiliary transistor ($Q_A$) is closed so as to ensure voltage balance across the ICBT cells 100. As such, power flow is from the source, to the main capacitor 102 of the converter, to the load and not through the auxiliary transistors and the auxiliary capacitors of the ICBT cells 100. In some embodiments, the controller 104 does not provide voltage balancing control for the ICBT cells 100 due to the self-balancing nature of the ICBT cells 100. In other embodiments, the ICBT cells 100 are switched using closed-loop control to provide voltage balancing control for the ICBT cells 100.

Based on the operation of the ICBT cell 100 described above, where power is sunk directly from the source to the load, the capacitance of the ICBT cell 100 can be an order of magnitude smaller than the capacitance needed by a conventional power cell or power converter module. For example, simulations by the inventors have shown that approximately 10 times less capacitance is needed for the size of the ICBT cells 100.

ICBT operation is unique throughout its conduction, blocking, and commutating states. Each ICBT cell 100 can be implemented with any type of semiconductor device, any type of packaging technology, any type of package configuration (discrete or multi-device), and any type of semiconductor material. For example, the auxiliary transistor ($Q_A$) and the main transistor ($Q_M$) of each ICBT cell 100 can be IGBTs (insulated gate bipolar transistors), power MOSFETs (metal oxide semiconductor field effect transistors), etc. The auxiliary transistor and the main transistor of each ICBT cell 100 can be Si, GaN or SiC transistors or a combination of Si and GaN, Si and SiC, GaN and SiC, etc. In general, the auxiliary transistor and the main transistor of each ICBT cell 100 can comprise any type of semiconductor material such as mono-crystalline silicon, or any binary, ternary or e.g. quaternary III-V compound semiconductor material.

Figure 3:
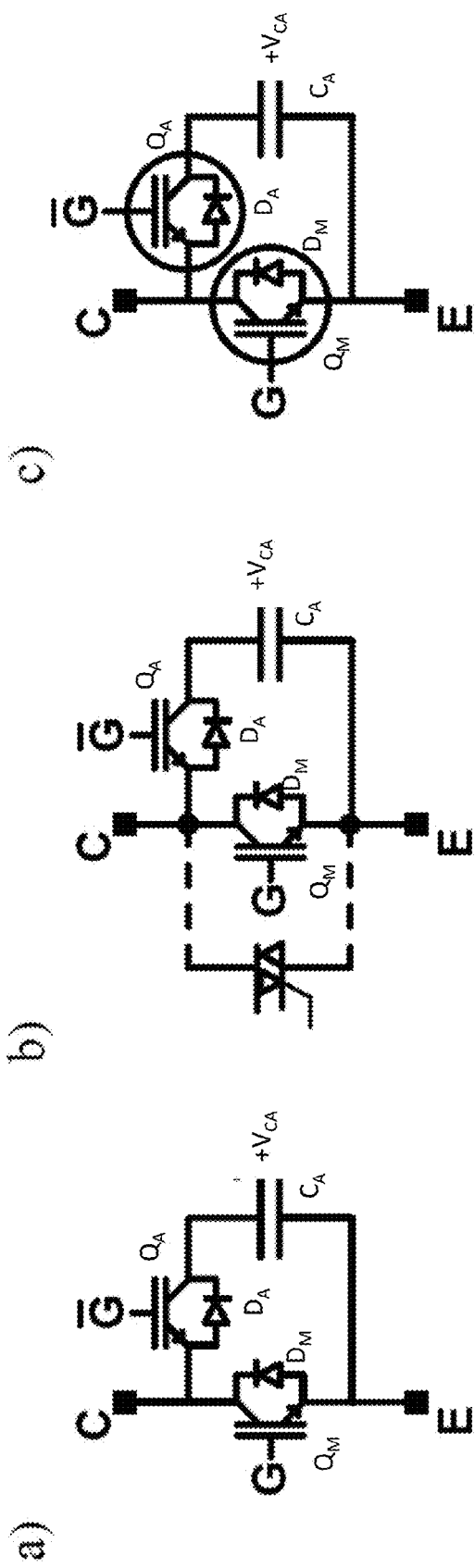
FIG. 3 illustrates different types of ICBT cells included in a multi-level power converter constructed from ICBT cells.

FIG. 3 shows different exemplary ICBT cell configurations using silicon IGBT devices. However, any other standard transistor could be used instead. Specifically, FIG. 3(a) depicts the basic concept for an IGBT cell in a wire-bond power module package such as a discrete or multi-chip, multi-switch package. FIG. 3(b) shows an alternative ICBT configuration using a wire-bond power module package with a parallel-connected bypass switch based on press-pack thyristors to ensure short-circuit failure mode. FIG. 3(c) shows an ICBT configuration implemented using IGBTs in press-pack packages, in which case due to their short-circuit failure mode, there is no need for an external bypass switch in case of device failure.

Figure 4:
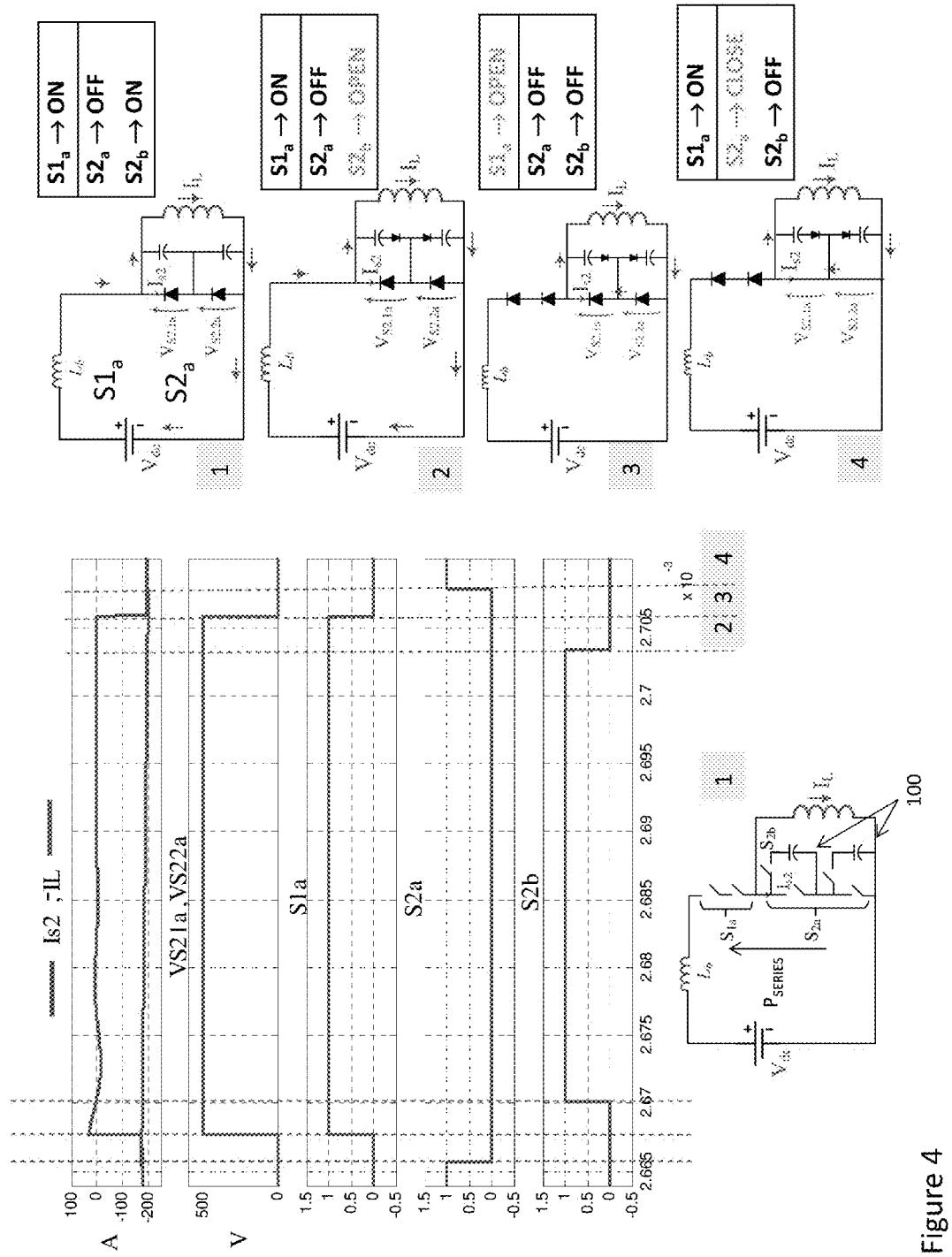
FIGS. 4 and 5 show the operational states of two series connected ICBT cells in the series connection path of a multi-level power converter constructed from ICBT cells.
Figure 5:
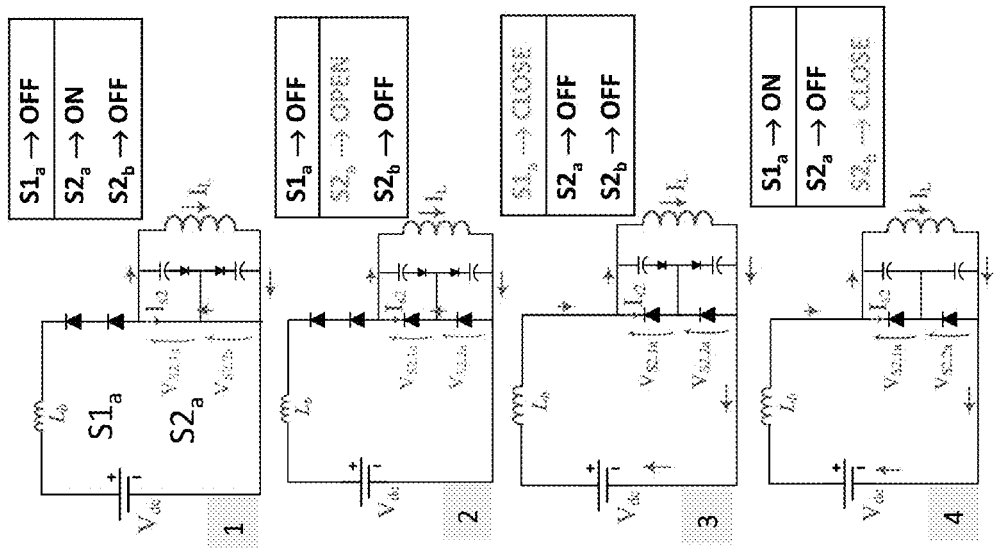
Figure 5:
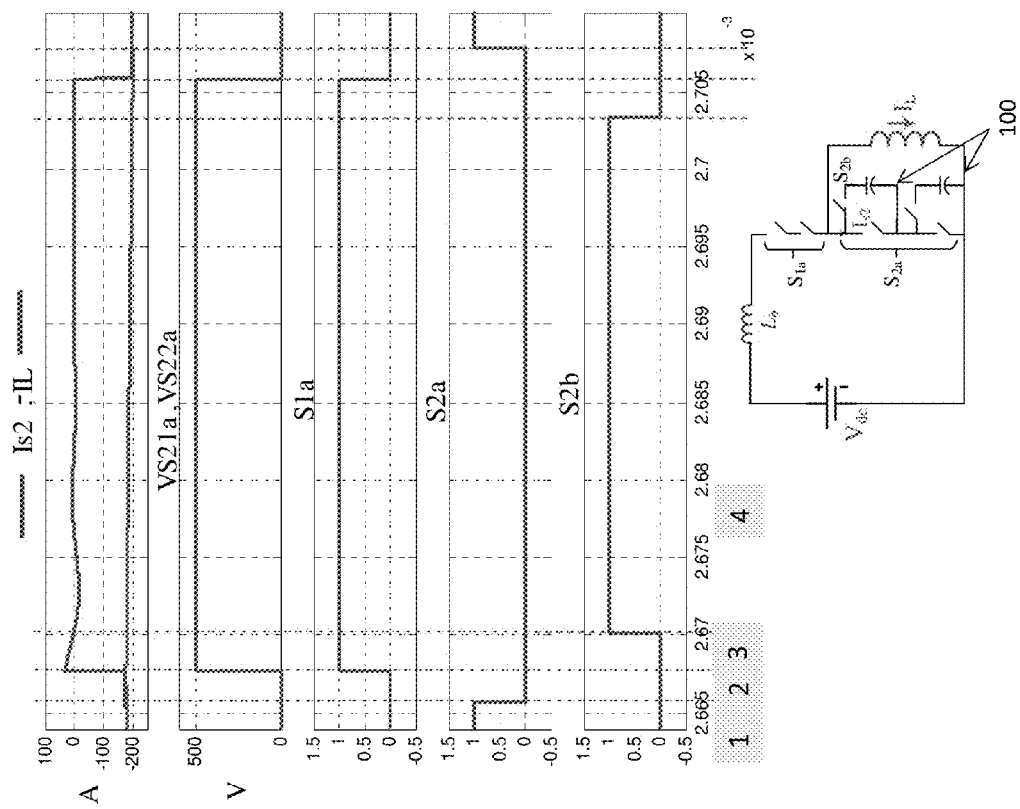

FIGS. 4 and 5 show the operation of two ICBT cells 100 in the series connection path of a MV or HV 2-Level power converter constructed from ICBT cells. Both bottom main transistors of the ICBT cells 100 are labeled 'S2a', and both auxiliary transistors are labeled 'S2b'. The top main transistors are labeled 'S1a' and can be implemented as series of additional ICBT cells. The current commutation paths from top-main-transistors (S1a) to bottom-main-transistors (S2a), which represents, for those skilled in the art, the operation of almost all converters to be realized with the ICBT cells are illustrated with arrows in FIGS. 4 and 5.

FIG. 4 shows the process of turning on the main transistors S2a of the ICBT cells 100. The turn on process of the main transistors S2a has four stages. The on/off and open/closed status of the converter transistors is shown in the right-hand side of FIG. 4 for all four stages of the turn on process. The top-left part of FIG. 4 shows the control signals S1a, S2a, S2b applied to the respective gates of the converter transistors, which are schematically shown in the bottom-left part of FIG. 4. The top-left part of FIG. 4 also shows the voltages VS21a, VS22a across the main transistors of the ICBT cells 100, and the current IS2 through the series connection path ($P_{SERIES}$) of the converter and the load current IL. The main capacitor of the converter is represented as a battery Vdc. The auxiliary capacitor of each ICBT cell 100 is charged through the auxiliary diode of that ICBT cell 100 and remains fully charged during switching of the ICBT cell 100. It may be necessary to include an additional soft charging circuit to limit the capacitor inrush current as in conventional power electronics converters.

The main and auxiliary transistors of each ICBT cell 100 are switched in a complementary way, and the respective auxiliary capacitors are charged through the corresponding auxiliary diodes. When the auxiliary transistors close, the auxiliary capacitor voltages are imposed on the corresponding main transistors, ensuring voltage balance across the ICBT cells 100. During the first phase (1) of the turn on process, transistor S1a and auxiliary ICBT transistors S2b are on and main ICBT transistors S2a are off so that current flows directly from the main capacitor to the load and a self-balancing current flows through auxiliary transistors S2b and maintains the auxiliary capacitors fully charged. During the second phase (2) of the turn on process, transistor S1a remains on, auxiliary ICBT transistors S2b are opened and main ICBT transistors S2a remain off so that current continues to flow directly from the main capacitor to the load and the self-balancing current continues flowing through body diodes of auxiliary transistors S2b and maintains auxiliary capacitors fully charged. During the third phase (3) of the turn on process, transistor S1a is opened, auxiliary ICBT transistors S2b are off and main ICBT transistors S2a remain off so that the load current commutates from top transistors (S1a) of ICBT cells 100 to bottom ICBT cells (S2a) and the voltage across the main ICBT transistors S2a drops from ½ Vdc to 0V. In this phase, the self-balancing current is interrupted and the auxiliary capacitors stop participating in the circuit staying virtually fully charged. During the fourth and final phase (4) of the turn on process, transistor S1a is on, auxiliary ICBT transistors S2b remain off and main ICBT transistors S2a are closed so that the load current continues flowing through the ICBT cells 100 and the voltage across the main ICBT transistors S2a remains at 0V. The controller 104 shown in FIG. 1 controls the gates of the converter transistors as shown in FIG. 4 e.g. via PWM control. This includes requiring an intra-cell dead time between turning off one of the main transistors of each ICBT cell 100 and turning on the auxiliary transistor within the same cell. An additional dead time is included between turning-off the top main transistors S1a and turning-on the bottom main transistors S2a, where the former dead time is larger than the latter. In FIG. 4, the intra-cell dead time corresponds to the time period associated with the second (2) and third (3) phases of the turn on process during which turn on of the main ICBT transistors S2a is delayed after switching off the auxiliary ICBT transistors S2b. Also in FIG. 4, the additional dead time between top main transistor S1a and bottom main transistors S2a corresponds to phase (3).

FIG. 5 shows the process of turning off the bottom main transistors S2a of the power converter. The turn off process of the bottom main transistors S2a also has four stages, and FIG. 5 shows the same switch state and voltage/current responses described above in connection with the turn on process shown in FIG. 4. In FIG. 5, the intra-cell dead time corresponds to the time period associated with the second (2) and third (3) phases of the turn off process during which turn on of the auxiliary ICBT transistors S2b is delayed after switching off the main ICBT transistors S2a. In FIG. 5, the additional dead time between turning-off bottom main transistor S2a and turning-on top main transistors S1a corresponds to only phase (2). Similarly than in FIG. 4, the former dead time is larger than the latter.

Figure 6:
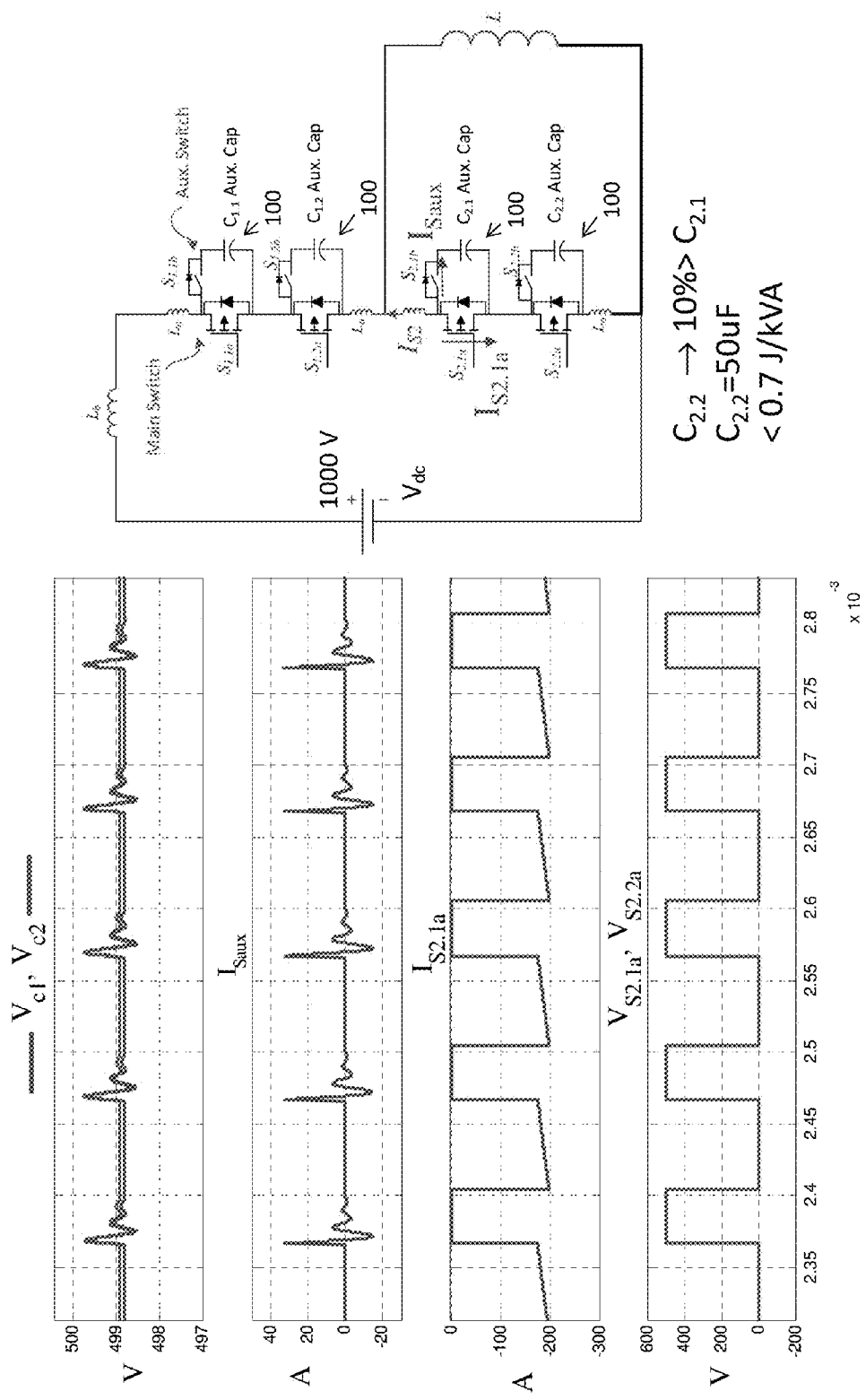
FIG. 6 shows the process of turning on the main ICBT cell transistors of a power converter constructed from ICBT cells.

FIG. 6 shows the process of turning on the main ICBT cell transistors S2a of a power converter which is constructed similar to the one shown in FIGS. 4 and 5, however, each transistor S1a is implemented as an additional ICBT cell and the energy-power ratio (in J/kVA) of the auxiliary capacitor $C_{2.2Aux.Cap}$ of the bottommost ICBT cell 100 is 10% greater than the energy-power ratio of the auxiliary capacitor $C_{2.1Aux.cap}$ of the next ICBT cell 100. As can be seen on the left-hand side of FIG. 6, the converter still functions properly despite the wide variation in energy-power ratios of the ICBT auxiliary capacitors. That is, the auxiliary capacitor of each ICBT cell 100 is charged through the auxiliary diode $S_{2.2b}$, $S_{2.1b}$ of that ICBT cell 100 and remains fully charged with at most slight perturbations during switching of the ICBT cell 100. The topmost plot on the left-hand side of FIG. 4 shows that each auxiliary capacitor (Vc1, Vc2) remains fully charged at just under 499V with slight perturbations (less than 1%) during switching of that ICBT cell 100 for this simulation even with the 10% variation in energy-power ratio of the ICBT auxiliary capacitors.

As explained previously herein, ICBT cells can be used in various types of converter topologies. For example, the converter can be a 2-level or 3-level DC/DC converter and the main capacitor can have a size of at least 7 J/kVA. In another example, the converter can be a modular multi-level converter and the main capacitor can have a size between 12 to 14 J/kVA. In most converter topologies, the auxiliary aggregated capacitance of all ICBT cells 100 has a total value of less than 1 J/kVA since power flow is from the source, to the main capacitor 102 of the converter, to the load through the main transistors and not through the auxiliary transistors and the auxiliary capacitors of the ICBT cells 100. In some embodiments, the auxiliary transistor and the main transistor of each ICBT cell 100 has the same voltage rating and the auxiliary transistor has a current rating not larger than ⅓ of the main transistor. Described next are embodiments which adapt the series-connected ICBT topology previously described herein to specific types of converters.

Figure 7:
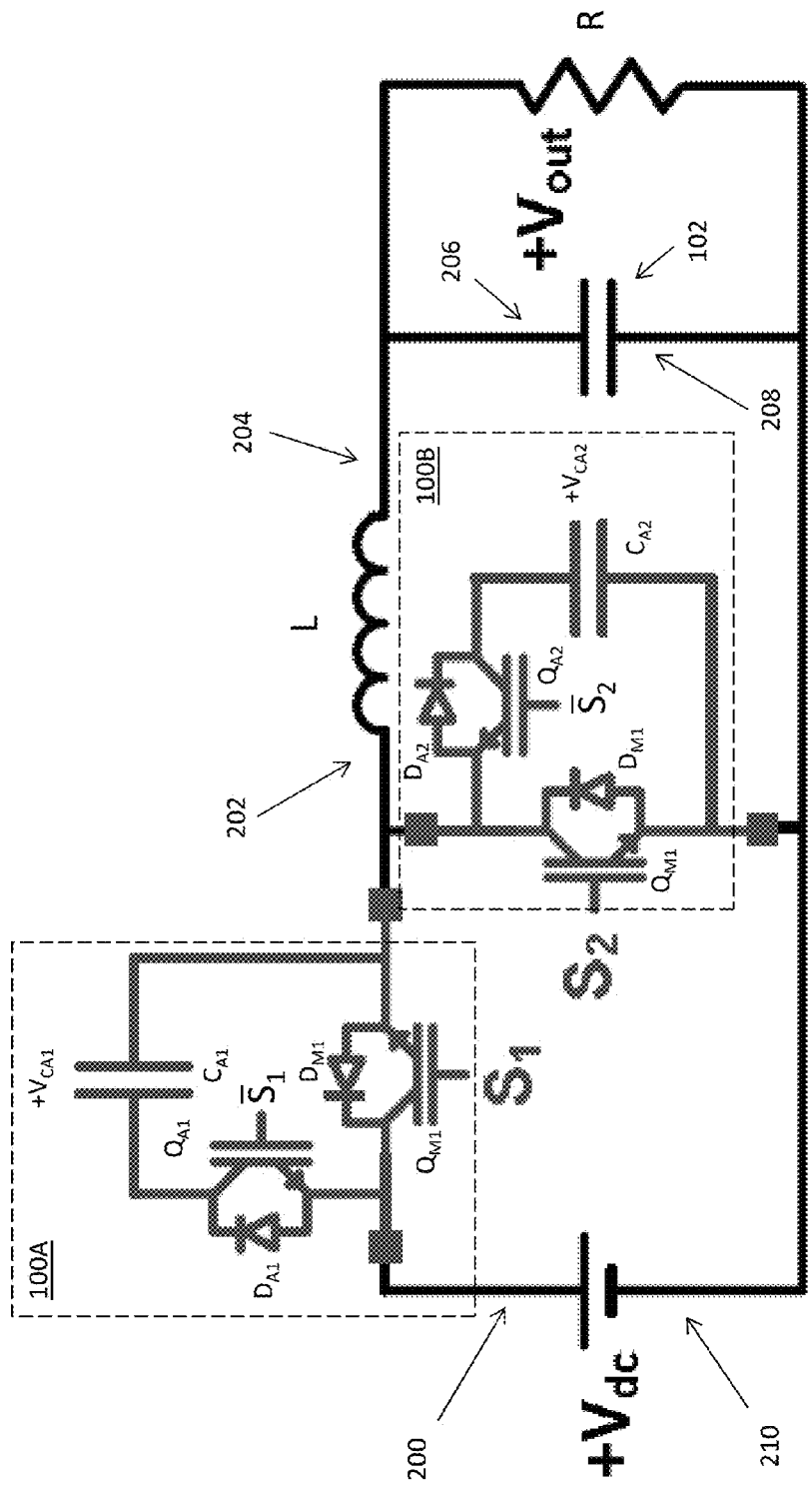
FIG. 7 illustrates an embodiment of a buck DC-DC converter constructed from ICBT cells.

FIG. 7 illustrates an embodiment in which a buck DC-DC converter is constructed from ICBT cells 100. A first ICBT cell 100A is electrically connected between a first terminal 200 of a voltage source (Vdc) and a first terminal 202 of an inductor (L). A second terminal 204 of the inductor is electrically connected to a first terminal 206 of the main capacitor 102, and a second terminal 208 of the main capacitor 102 is electrically connected to a second terminal 210 of the voltage source. A second ICBT cell 100B is electrically connected between the first terminal 202 of the inductor and the second terminal 208 of the main capacitor 102. The load is represented by a resistor (R). The gating signals ($S_1/\overline{S}_1$, $S_2/\overline{S}_2$) for the main transistor ($Q_M$) and auxiliary transistor ($Q_A$) of each ICBT cell 100A, 100B are complementary with an intra-cell dead time between turning off one of the transistors of each ICBT cell 100A, 100B and turning on the other transistor as previously described herein. Also, the main transistors of the ICBT cells 100A, 100B are switched on in parallel with an inter-cell dead time between turning on the main transistors of the ICBT cells 100A, 100B also as previously described herein. Accordingly, both transistors in each ICBT cell 100A, 100B block the integrated capacitor voltage ($V_{CA1/2}$) and not the DC source voltage Vdc. In this specific case, since there is only one ICBT cell 100A/100B per equivalent functional switch in the converter, each ICBT auxiliary capacitor is still charged to Vdc. However, if two or more ICBT cells 100 are connected in series for each equivalent functional switch, e.g. N series connected ICBT cells 100, then the integrated capacitor voltage of each ICBT cell 100 is 1/N times the source voltage Vdc.

Figures 8A, 8B:
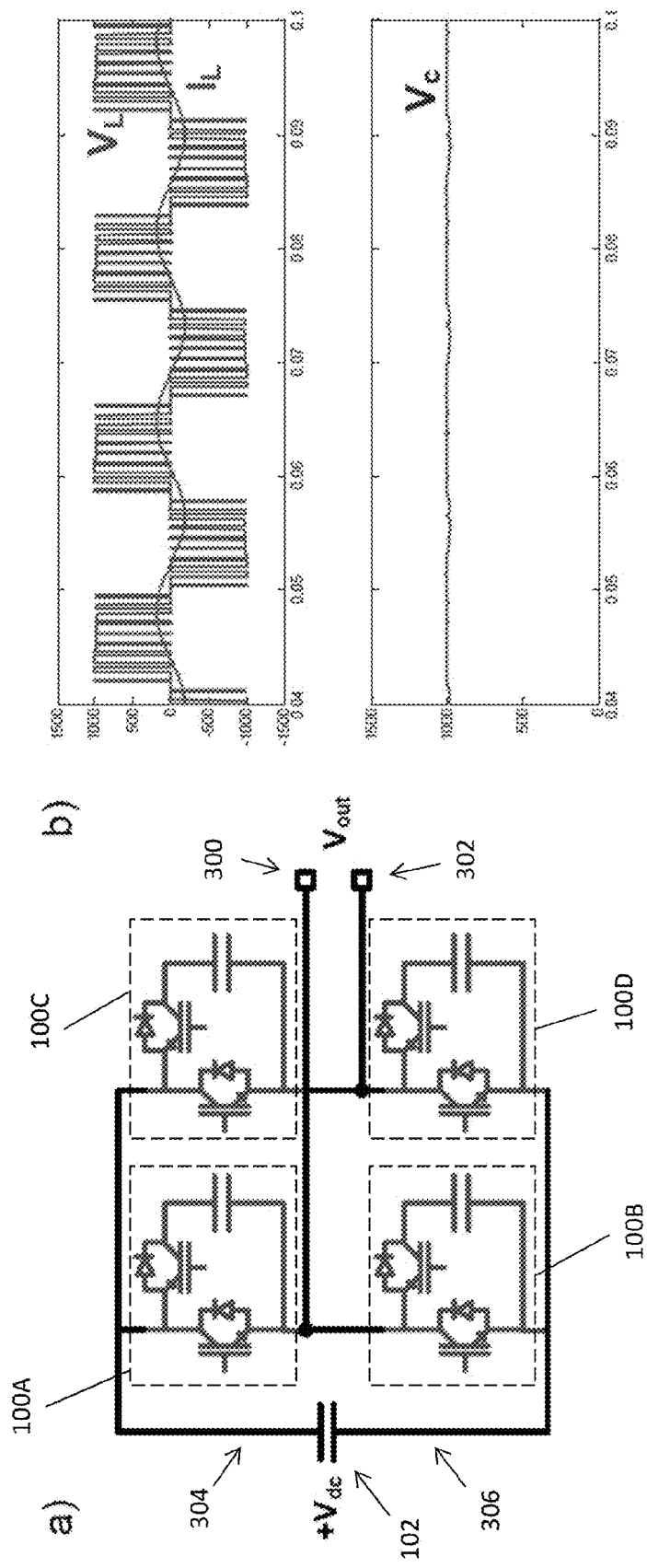
FIG. 8A illustrates an embodiment of an H-bridge voltage source inverter (VSI) constructed from ICBT cells.
FIG. 8B shows the output line voltage, output line current and ICBT capacitor voltages for the H-bridge VSI of FIG. 8A.

FIG. 8A illustrates an embodiment in which an H-bridge voltage source inverter (VSI) fed from a DC bus is constructed from ICBT cells 100. The H-bridge voltage DC voltage source inverter has first and second output terminals 300, 302 which form the output (Vout) of the inverter. A first ICBT cell 100A is electrically connected between a first terminal 304 of the main capacitor 102 and the first output terminal 300 and a second ICBT cell 100B is electrically connected between the first output terminal 300 and a second terminal 306 of the main capacitor 102 to form a first phase of the H-bridge voltage DC voltage source inverter. A third ICBT cell 100C is electrically connected between the first terminal 304 of the main capacitor and the second output terminal 302 and a fourth ICBT cell 100D is electrically connected between the second output terminal 302 and the second terminal 306 of the main capacitor 102 to form a second phase of the H-bridge voltage DC voltage source inverter. The H-bridge voltage DC voltage source inverter can operate with open-loop control using the same gating signals that would be used for a conventional H-bridge. The auxiliary transistor of each ICBT cell 100 is gated by the inverse of the signal applied to the corresponding main transistor of that ICBT cell 100 as previously explained herein.

FIG. 8B shows the output line voltage ($V_L$) and current ($I_L$) as well as an ICBT capacitor voltage ($V_C$) of the H-bridge VSI shown in FIG. 8A. As seen, without any control, the auxiliary capacitors of the ICBT cells 100 remain balanced and have only slight perturbations on them (less than 1%). Such balanced results are possible with open-loop control because the auxiliary ICBT capacitors are connected in parallel to the DC bus during the 'off state', generating self-balancing currents between them. As with the DC converter case shown in FIG. 7, if more ICBT cells 100 are used in each equivalent functional switch position, then these devices will share the DC bus voltage between them.

Another aspect is that the commutation-loop inductance in an ICBT-based converter lies within each ICBT cell 100, and not at the phase-leg level or assembly of series-connected ICBT cells 100, as ultimately the current commutates within the ICBT phase-leg construction and its internal DC bus. In effect, when multiple ICBT cells 100 are connected in series and operated as described herein, any inductance at the converter phase-leg level (string of ICBT cells) does not affect the converter commutation and does not create overvoltages at the integrated transistor level within the ICBT cell 100.

Furthermore, any inductance present at this level helps curtail the self-balancing currents that flow transitorily during the 'off state' of the ICBT cells 100 to balance the auxiliary capacitor voltages, which is beneficial for the converter operation. This has the advantage to simplify the design and construction of large ICBT-based converter units, as this feature ultimately favors the use of simpler (inductive) bars instead of planar, laminated DC bus constructions and phase-leg interconnections. Given the self-balancing nature of the ICBT operation, multiple devices can be stacked without the need of balancing controls.

Figures 9A, 9B:
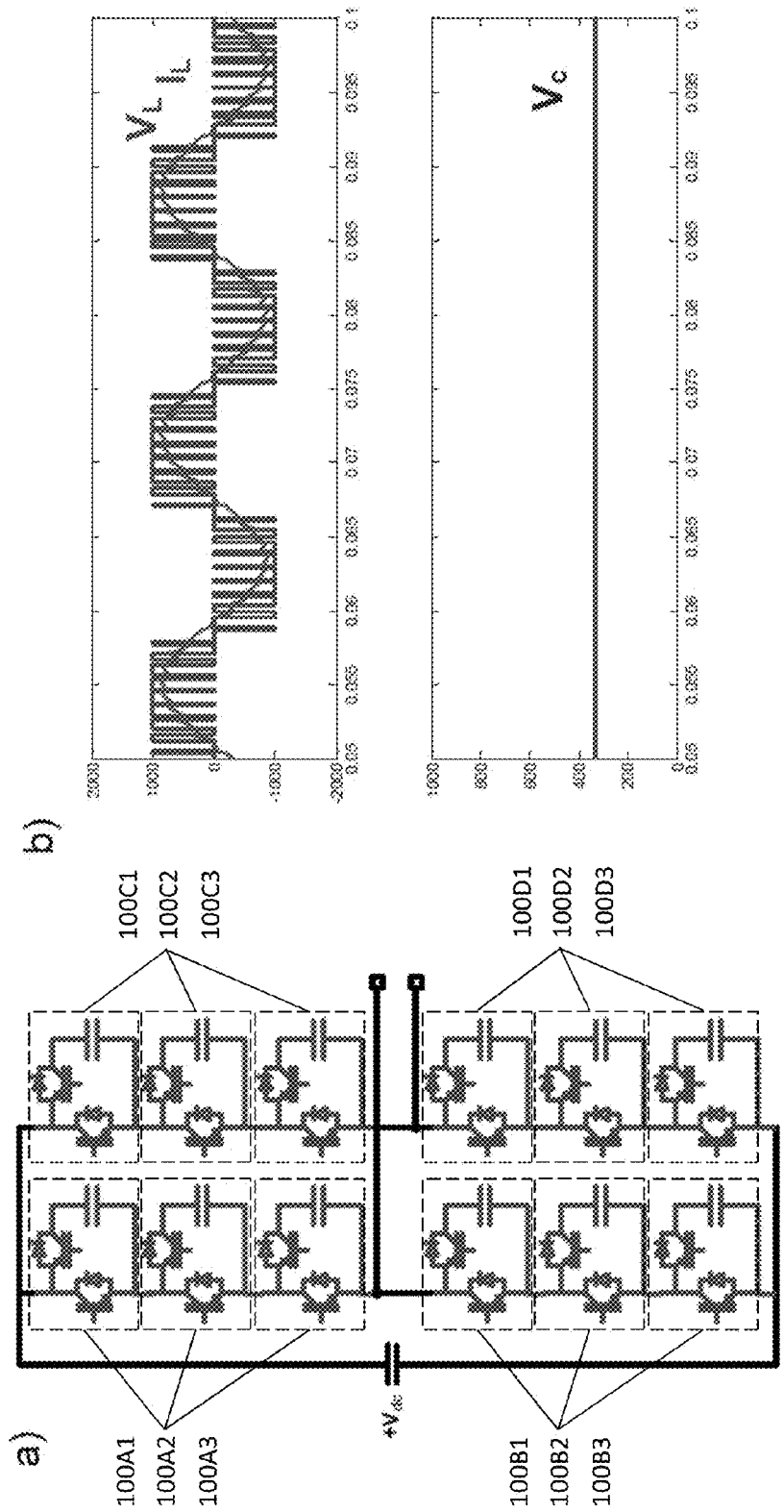
FIG. 9A illustrates an embodiment of an H-bridge VSI constructed from triple-stacked ICBT cells.
FIG. 9B illustrates the output line voltage, output line current and ICBT capacitor voltages for the H-bridge VSI of FIG. 9A.

FIG. 9A illustrates another embodiment in which the ICBT-based converter is an H-bridge voltage source inverter (VSI) fed from a DC bus. The converter embodiment shown in FIG. 9A is similar to the embodiment shown in FIG. 8A. Different, however, the converter uses triple-stacked ICBT cells 100A1,A2,A3/100B1,B2,B3/100C1,C2,C3/100D1,D2, D3 connected in FIG. 9A, where the gating signals for each phase-arm (string of three ICBT cells) corresponds to the top or bottom switch gating signals of a two-level converter.

FIG. 9B shows that the converter can operate in open-loop without any voltage balancing control. Particularly, FIG. 9B shows the output voltage ($V_L$) and current ($I_L$) as well as the ICBT capacitor voltages ($V_C$) of a phase-arm perfectly overlapping each other. In the case of a 1000 V DC bus and with three ICBT cells 100 used for each phase-arm, the integrated capacitor voltage of each phase-arm is 333.3 V which totals 1 kV of blocking capacity.

Figure 9C:
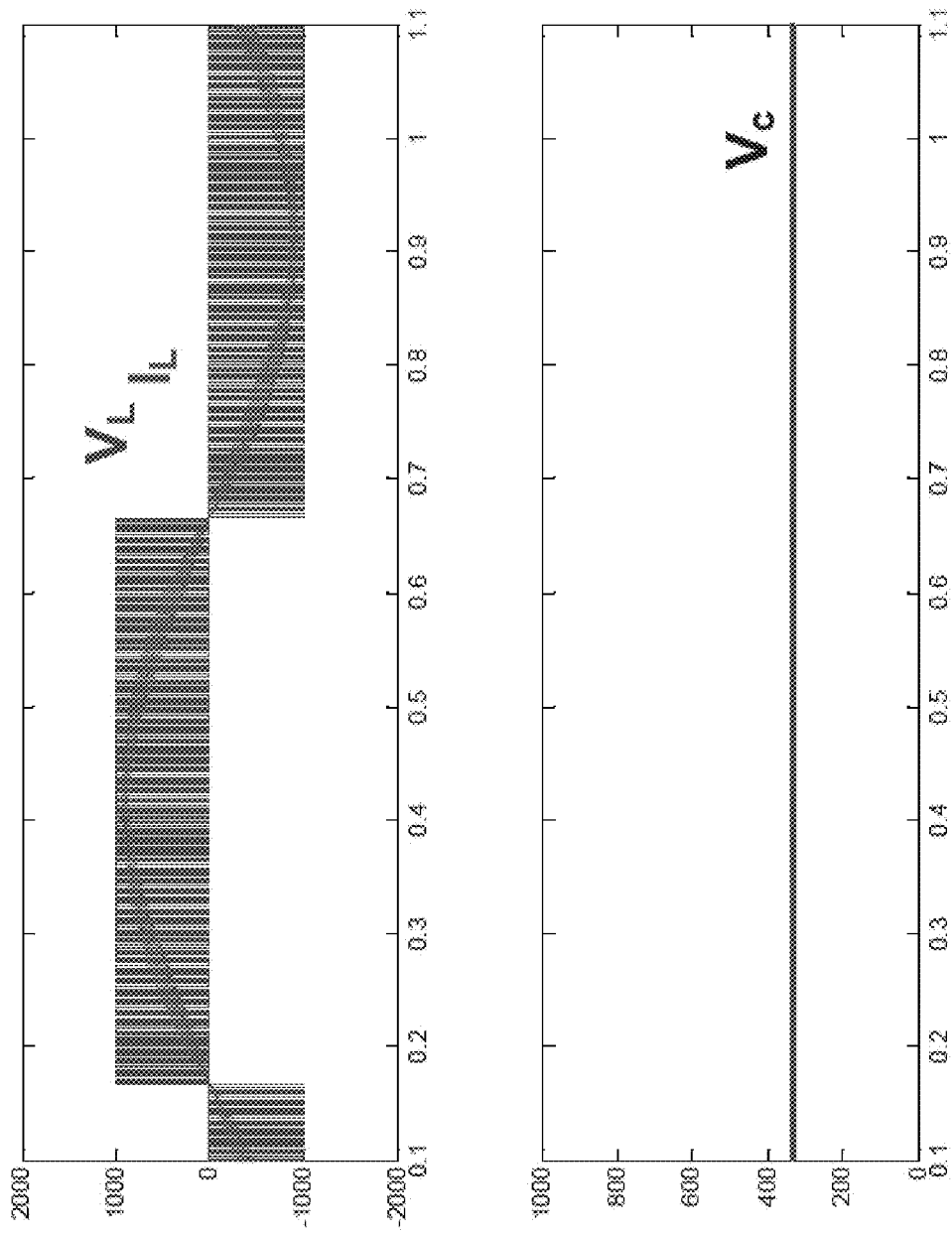
FIG. 9C illustrates the output line voltage, output line current and ICBT capacitor voltages for the H-bridge VSI of FIG. 9A for an output fundamental frequency of 1 Hz.

FIG. 9C illustrates the operational the same converter in FIG. 9A operating with an output fundamental frequency of 1 Hz, where the balancing of ICBT capacitor voltages is clearly seen. This verifies that no active power is provided by the ICBT cells 100, as otherwise the open-loop operation would not be feasible. This also establishes the capability of the ICBT cells 100 to operate in DC mode as well.

Figures 10A, 10B:
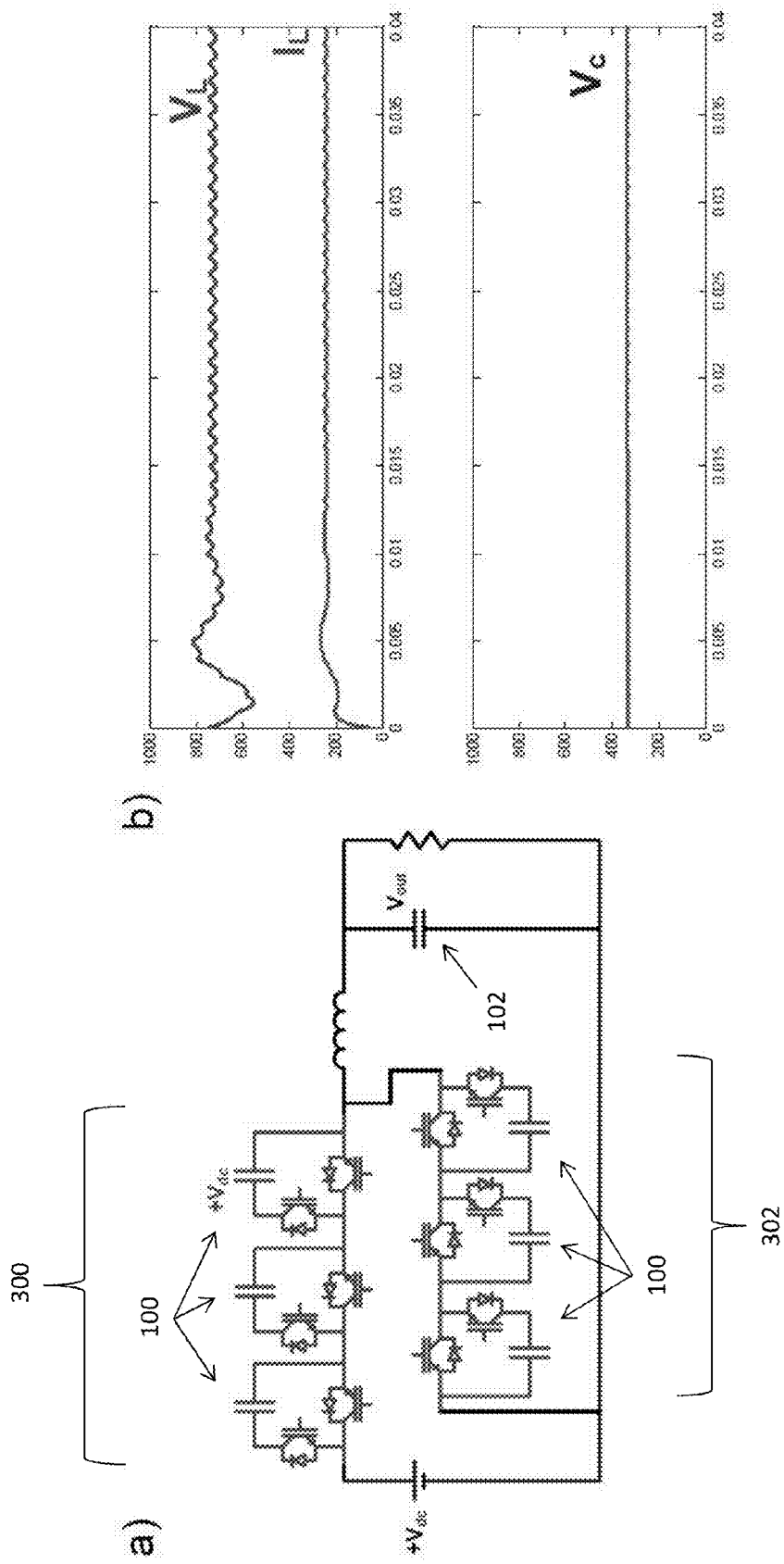
FIG. 10A illustrates an embodiment of a buck DC-DC converter constructed from a triple-stacked arrangement of ICBT cells.
FIG. 10B shows the output voltage, output current and ICBT capacitor voltages for the buck DC-DC converter of FIG. 10A.

FIG. 10A illustrates another embodiment in which the converter is a buck DC-DC converter. The converter embodiment shown in FIG. 10A is similar to the embodiment shown in FIG. 7. Different, however, the buck DC-DC converter has a triple-stacked arrangement 300, 302 of ICBT cells 100 in FIG. 10A for each equivalent functional switch of the converter.

FIG. 10B shows the output voltage ($V_L$) and current ($I_L$) as well as the ICBT capacitor voltages ($V_C$) for the buck DC-DC converter of FIG. 10A.

Figures 11A, 11B:
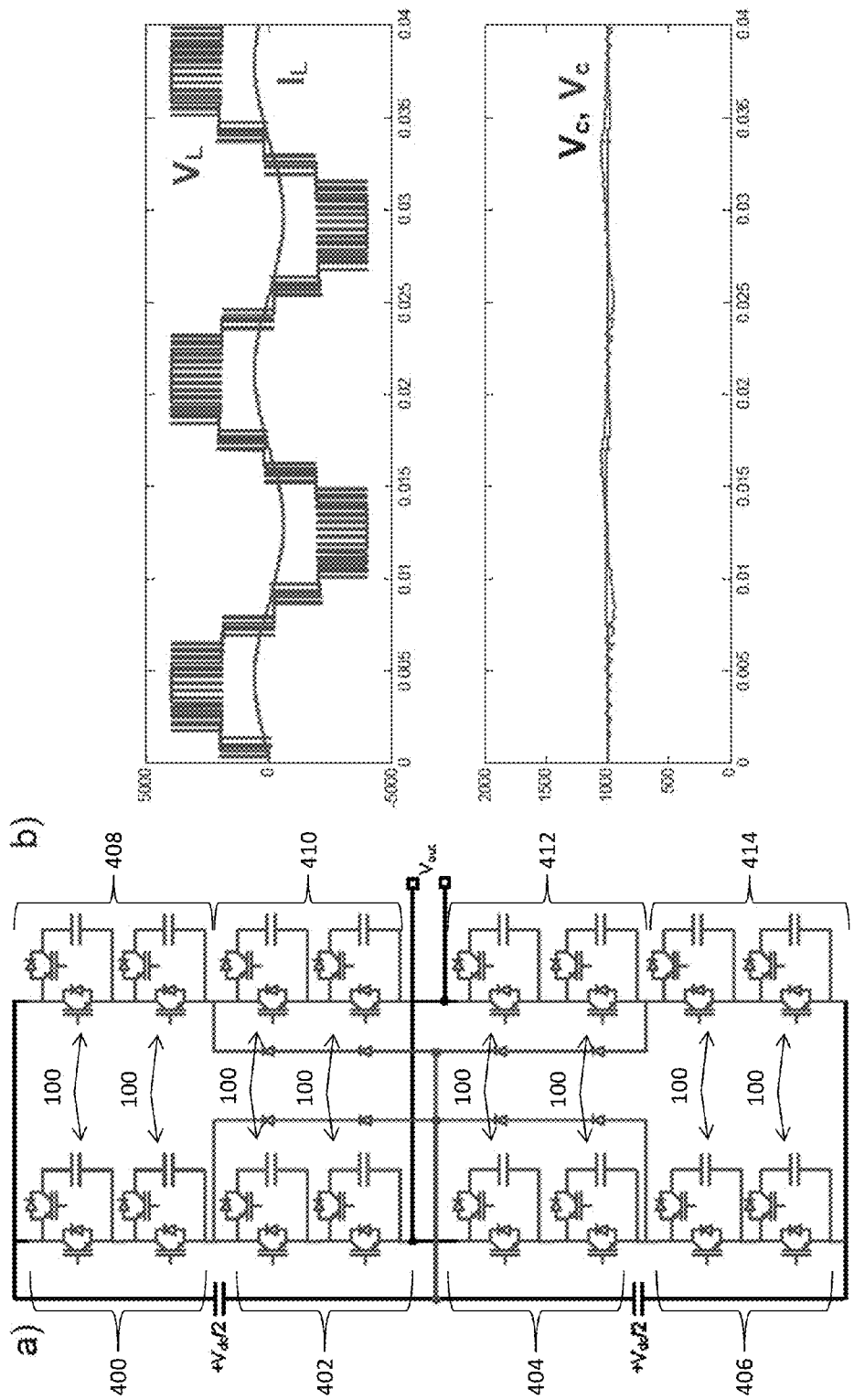
FIG. 11A illustrates an embodiment of a three-level NPC (neutral-point clamped) converter constructed from dual-stacked ICBTs.
FIG. 11B illustrates the output line-to-line voltage, output line-to-line current and ICBT capacitor voltages for the three-level NPC of FIG. 11A.

FIG. 11A illustrates an embodiment in which the converter is three-level NPC (neutral-point clamped) converter using multiple arrangements 400, 402, 404, 406, 408, 410, 412, 414 dual-stacked ICBT cells 100, where equivalent functional switches are replaced by stacked ICBT cells 100 to achieve higher voltages. Each arrangement 400/402/404/406/408/410/412/414 of dual stacked ICBT cells 100 replaces an equivalent functional switch of a conventional three-level NPC to form the new converter.

FIG. 11B illustrates the output line-to-line voltage ($V_L$) and current ($I_L$) as well as the ICBT capacitor voltages ($V_C$) for the three-level NPC shown in FIG. 11A. In this case, the outer ICBT cells 100 present a flat DC voltage whereas the inner ICBT cells 100 connecting the AC terminal to the neutral point show a low frequency oscillation. Although this variation is intrinsic to the converter operation, its average value is constant allowing the ICBT cells 100 to remain charged.

Other types of DC-DC converters such as boost, buck-boost, Cuk, etc. can be implemented by replacing functional switches with stacked ICBT cells which are operated according to the embodiments described herein. Converters with high frequency isolation can also be realized, all of them featuring simple controls and reduced measurement requirements.

The ICBT-based converter embodiments described herein apply mainly to medium and high voltage power converters where multiple ICBT cells with lower voltage rating are connected in series and used to implement a power converter circuit. The ICBT cells allow for a transparent and simple series connection, avoiding both static and dynamic voltage sharing issues which plague the series-connection of conventional power semiconductors. For example, ICBT cells rated at 600-800 V could be implemented with 1.2 kV IGBT cells and these ICBT cells could be used to form any two-level or multi-level converter topology, including but not limited to modular power converter topologies. By connecting as many ICBT cells in series per equivalent functional converter switch, any desired voltage rating can be attained. In a specific ICBT case of 600 V rating, a two-level converter rated at 600 V DC would use one ICBT cell per switch. For a 6 kV DC converter, 10 ICBT cells would be used, etc. This naturally enables the generation of endless new higher voltage power conversion topologies.

The ICBT-based converter embodiments described herein also enable the use of GaN semiconductors in high voltage applications, as 600 V lateral GaN devices could be used to build 300-400 V GaN-based ICBT cells to implement highly-efficient low voltage power converters switching at tens or potentially hundreds of kilohertz. Vertical GaN devices rated above 600 V e.g. at 1.2 kV or higher could be easily adopted as well. Further, low voltage SiC devices or SiC devices rated at 10 kV or more could be used in SiC-based ICBT cells, allowing for the simple construction of ICBT-based converters using SiC technology switching at elevated frequency while having a rating of tens of kilovolts. Further, although aimed for high power applications and medium and high voltage converters, the ICBT-based converter embodiments described herein could be used for low voltage power converters using highly efficient lower voltage semiconductors such as power MOSFETs. Where multiple ICBT cells rated at 200 V could be built using 300 V MOSFETs for 690 V AC motor drives, using two- or multi-level circuit configurations. The use of GaN semiconductors would allow in this case higher switching frequencies and higher efficiencies.

Another potential application for the ICBT-based converter embodiments described herein is in high power DC-DC converters for medium and high voltage applications, as the ICBT cells can easily operate with DC power flow given its intrinsic feature of not participating in the power flow between the source and the load—as in other modular converter technologies. The ICBT cells simply help direct the power flow between the source and load without transitorily storing it. This allows for a new category of power converters enabled by the ICBT converter cell concepts described herein.

Yet another potential application for the ICBT-based converter embodiments described herein is higher switching frequency applications which requires higher voltage and power, as the ICBT cells can maintain the high switching frequency characteristic of its semiconductor devices, e.g., 1.2 kV Si IGBT or 1.2 kV SiC MOSFET devices, given that any commutation loop inductance restrictions only apply within its own package, and as such can be easily handled. Large converter assemblies operating at high switching frequency are thus feasible and with favorable inductive phase-leg and bus bar characteristics. This is as opposed to conventional switching converters which are severely limited by this physical constraint and must accordingly limit their commutation speed, besides being limited by the lower commutation speeds of higher voltage semiconductors.

The ICBT-based converter embodiments described herein provide converter solutions that attain higher voltage ratings namely by the stacking of power devices or the use of multi-level topologies of both switching network and modular construction types. In effect, the ICBT cell structure is such that it enables its unrestricted series connection to reach any desired voltage blocking capacity at a 'switch' level, eliminating the need for voltage-sharing circuitry and all risks involved with the use of series connection as previously described herein.

The above characteristic can be readily exploited by using lower voltage semiconductor devices to implement higher voltage power converters replacing higher voltage semiconductors devices with ICBT cells based on lower voltage devices. Lower voltage semiconductor devices are manufactured in increasingly higher volumes, and consequently represent increasingly lower costs, while also featuring higher power conversion efficiency due to their lower switching energy, and allowing their operation at higher switching frequency.

Furthermore, the ICBT-based converter embodiments described herein do not require devices such as clamps, snubber circuits, active gate-controls, etc. since the semiconductor devices in the ICBT cells only need block the integrated capacitor voltage. Also, the commutation loop is easily handled within the ICBT cell circuit, as the main commutation loop resides in the ICBT itself, allowing for minimization of parasitic loop inductance. At the phase-leg, DC bus, or converter level, the ICBT-based converter approach favors inductive connections and busbars, which simplifies the design and construction of high power converters that typically embody large assemblies. Conversely with press-pack based power converters, the construction of larger power converters becomes increasingly more difficult as the main commutation loops are still determined by the semiconductors—IGBTs and diodes for instance—discretely mounted and interconnected using bus bars. This severely hinders switching speeds which can be used as well as the operational switching frequency of these converters.

Also, as ICBT cells do not participate in the power flow from source to load but only help direct the power flow emulating the switching network topology, the energy storage requirement of the integrated ICBT cell capacitors is typically an order of magnitude lower than the energy storage requirement of power modules in modular multilevel converters. Moreover, this same power flow characteristic allows ICBT-based converters to operate unrestrictedly in AC-AC, AC-DC, DC-AC and DC-DC modes, just a switching network topologies, without having any limitations regarding the AC terminal frequency and enabling the operation in purely DC mode, thus enabling ICBT-based high power medium and high voltage DC-DC converters.

This inherent property of the ICBT cells also enables them to retain their charge throughout the operation of the power converter in a self-balanced manner, resulting in a minimum sensitivity to parametric mismatch between ICBT cells. This translates into simplified digital control hardware system requirements, which represents a significant advantage over conventional modular power converters as they require a more comprehensive communication infrastructure to transmit measured voltages, duty cycles and gating signals between the power modules and a central controller, or an array of central controllers depending on the size and power rating of the power converter.

The ICBT-based converter embodiments described herein can be applied to any standard power converter topology, which can be easily scaled in terms of voltage rating by the seamless series-connection capability featured by ICBT cells. This unique feature allows for new ways to construct power converter topologies, using networks of power processors, that is, ICBT cells, instead of conventional 'switches' in switching network topologies, or instead of power converter building blocks as in modular converter topologies. As such, ICBT cells can be adopted directly into a myriad of high power and multilevel power converter topologies.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A converter for connecting a voltage source to a load, the converter comprising:
   a plurality of ICBT (integrated capacitor blocked transistor) cells configured as switches and connected in series to form a series connection path, each ICBT cell comprising a main transistor disposed in the series connection path and a series connected auxiliary transistor and auxiliary capacitor coupled in parallel with the main transistor;
   a main capacitor connected across the series connection path, the main capacitor having a greater energy-power ratio as expressed in J/kVA than the auxiliary capacitors of the ICBT cells; and
   a controller operable to develop a voltage across the main capacitor which exceeds a voltage rating of the ICBT cells, by switching the ICBT cells so as to commutate current within the individual ICBT cells without the ICBT cells providing active power to the load so that power flow is from the voltage source, to the main capacitor, to the load and not through the auxiliary transistors and the auxiliary capacitors.

2. The converter of claim 1, wherein the controller is operable to switch the main transistor and the auxiliary transistor of each ICBT cell in a complementary way with a first dead time between turning off one of the main transistors of each ICBT cell and turning on the auxiliary transistor within the same ICBT cell and with a second dead time between turning-off the main transistors of an arm carrying current and turning-on the main transistors of the same arm or an arm where the current is to commute.

3. The converter of claim 2, wherein the first dead time is larger than the second dead time.

4. The converter of claim 1, wherein each ICBT cell comprises a first diode in parallel with the auxiliary transistor of that ICBT cell, and wherein the auxiliary capacitor of each ICBT cell is charged through the first diode of that ICBT cell and remains fully charged with at most slight perturbations during switching of that ICBT cell.

5. The converter of claim 4, wherein a voltage of the auxiliary capacitor of each ICBT cell is imposed on the main transistor of that ICBT cell when the auxiliary transistor is closed so as to ensure voltage balance across the ICBT cells without the controller having to provide voltage balancing control for the ICBT cells.

6. The converter of claim 1, wherein the auxiliary capacitors of the ICBT cells have an aggregated size less than 1 J/kVA.

7. The converter of claim 1, wherein the auxiliary transistor and the main transistor of each ICBT cell have the same voltage rating and the auxiliary transistor has a current rating not larger than ⅓ of the main transistor.

8. The converter of claim 1, wherein the auxiliary transistor and the main transistor of each ICBT cell are IGBTs (insulated gate bipolar transistors).

9. The converter of claim 1, wherein the auxiliary transistor and the main transistor of each ICBT cell are power MOSFETs (metal oxide semiconductor field effect transistors).

10. The converter of claim 1, wherein the auxiliary transistor and the main transistor of each ICBT cell are GaN transistors.

11. The converter of claim 1, wherein the auxiliary transistor and the main transistor of each ICBT cell are SiC transistors or a combination Si and SiC.

12. The converter of claim 1, wherein:
the converter is a buck DC-DC converter;
one or more first ones of the ICBT cells are electrically connected between a first terminal of the voltage source and a first terminal of an inductor;
a second terminal of the inductor is electrically connected to a first terminal of the main capacitor;
a second terminal of the main capacitor is electrically connected to a second terminal of the voltage source; and
one or more second ones of the ICBT cells are electrically connected between the first terminal of the inductor and the second terminal of the capacitor.

13. The converter of claim 12, wherein:
at least two first ones of the ICBT cells are electrically connected between the first terminal of the voltage source and the first terminal of the inductor;
at least two second ones of the ICBT cells are electrically connected between the first terminal of the inductor and the second terminal of the capacitor; and
the controller operates open-loop without voltage balancing control for the ICBT cells.

14. The converter of claim 1, wherein:
the converter is a H-bridge voltage DC voltage source inverter having a first output terminal and a second output terminal;
one or more first ones of the ICBT cells are electrically connected between a first terminal of the main capacitor and the first output terminal and one or more second ones of the ICBT cells are electrically connected between the first output terminal and a second terminal of the main capacitor to form a first phase of the H-bridge voltage DC voltage source inverter; and
one or more third ones of the ICBT cells are electrically connected between the first terminal of the main capacitor and the second output terminal and one or more fourth ones of the ICBT cells are electrically connected between the second output terminal and the second terminal of the main capacitor to form a second phase of the H-bridge voltage DC voltage source inverter.

15. The converter of claim 14, wherein:
at least two first ones of the ICBT cells are connected in series to form a first phase arm of the first phase;
at least two second ones of the ICBT cells are connected in series to form a second phase arm of the first phase;
at least two third ones of the ICBT cells are connected in series to form a first phase arm of the second phase;
at least two fourth ones of the ICBT cells are connected in series to form a second phase arm of the second phase; and
the controller operates open-loop without voltage balancing control for the ICBT cells.

16. The converter of claim 1, wherein the controller is operable to switch the ICBT cells using open-loop control without providing voltage balancing control for the ICBT cells.

17. A method of voltage conversion between a voltage source and a load, the method comprising:
connecting a plurality of ICBT (integrated capacitor blocked transistor) cells configured as switches in series to form a series connection path, each ICBT cell comprising a main transistor disposed in the series connection path and a series connected auxiliary transistor and auxiliary capacitor coupled in parallel with the main transistor;
connecting a main capacitor across the series connection path, the main capacitor having a greater energy-power ratio as expressed in J/kVA than the auxiliary capacitors of the ICBT cells; and
developing a voltage across the main capacitor which exceeds a voltage rating of the ICBT cells, by switching the ICBT cells so as to commutate current within the individual ICBT cells without the ICBT cells providing active power to the load so that power flow is from the voltage source, to the main capacitor, to the load and not through the auxiliary transistors and the auxiliary capacitors.

18. The method of claim 17, wherein switching the ICBT cells so as to commutate current within the individual ICBT cells without the ICBT cells providing active power to the load comprises:
switching the main transistor and the auxiliary transistor of each ICBT cell in a complementary way with a first dead time between turning off one of the main transistors of each ICBT cell and turning on the auxiliary transistor within the same ICBT cell and with a second dead time between turning-off the main transistors of an arm carrying current and turning-on the main transistors of the same arm or an arm where the current is to commute.

19. The converter of claim 18, wherein the first dead time is larger than the second dead time.

20. The method of claim 17, wherein the ICBT cells are switched using open-loop control without providing voltage balancing control for the ICBT cells.

21. The method of claim 17, wherein the ICBT cells are switched using closed-loop control to provide voltage balancing control for the ICBT cells.

* * * * *